United States Patent [19]

Hammond

[11] Patent Number: 5,646,217
[45] Date of Patent: Jul. 8, 1997

[54] POLYMER COMPOSITION CONTAINING POLYHYDROXYALKANOATE AND METAL COMPOUND

[75] Inventor: Timothy Hammond, Cleveland, United Kingdom

[73] Assignee: Zeneca Limited, London, England

[21] Appl. No.: 433,343

[22] PCT Filed: Nov. 4, 1993

[86] PCT No.: PCT/GB93/02280

§ 371 Date: May 5, 1995

§ 102(e) Date: May 5, 1995

[87] PCT Pub. No.: WO94/11440

PCT Pub. Date: May 26, 1994

[30] Foreign Application Priority Data

Nov. 6, 1992 [GB] United Kingdom ............ 9223351

[51] Int. Cl.$^6$ ............ C08L 67/04; C08G 63/06
[52] U.S. Cl. ............ 525/450; 525/54.21; 525/411; 525/415; 528/300; 528/354; 528/357; 528/358; 528/361; 523/124
[58] Field of Search ............ 523/124; 524/430, 524/433, 409; 525/410, 411, 415, 54.21, 450; 528/300, 354, 357, 358, 361

[56] References Cited

U.S. PATENT DOCUMENTS

| 5,124,371 | 6/1992 | Tokiwa et al. | 525/411 |
| 5,191,016 | 3/1993 | Yalpani | 528/361 |
| 5,252,701 | 10/1993 | Jarrett et al. | 525/411 |
| 5,281,691 | 1/1994 | Hubbs et al. | 528/361 |
| 5,439,985 | 8/1995 | Gross et al. | 525/411 |

FOREIGN PATENT DOCUMENTS

| 2029747 | 5/1991 | Canada. |
| 63-172762 | 7/1988 | Japan. |
| 04146952 | 5/1992 | Japan. |

*Primary Examiner*—Tae Yoon
*Attorney, Agent, or Firm*—Cushman Darby & Cushman IP Group Pillsbury Madison & Sutro LLP

[57] ABSTRACT

Polymer compositions are provided which comprise a first polyhydroxyalkanoate component and optionally a second polymer component, the composition have enhanced properties by using an inorganic oxygen containing compound in the composition. The inorganic oxygen containing compound may be acting as a transesterification catalyst.

9 Claims, No Drawings

POLYMER COMPOSITION CONTAINING POLYHYDROXYALKANOATE AND METAL COMPOUND

POLYESTERS

This invention relates to polyesters and in particular to compositions comprising polyesters and inorganic oxygen containing compounds.

It is a common problem that some polyesters are not mutually compatible and the blends thereof have inferior properties to the separate polyesters.

It has now been found that transesterification catalysts used in such blends increase compatibility and hence improve physical properties. Such catalysts may maintain or increase the molecular weight of polyester or blend of different polyesters or to increase the resulting melt viscosity of blends of polyesters whose individual components have widely differing melt viscosities.

According to the invention a polymer composition comprises a first component which is a microbiologically produced polyhydroxyalkanoate (PHA) and a second component which is a different microbiologically produced PHA or is a synthetic polyester, and at least one transesterification catalyst which is an oxy compound of a metal from Group IIA or IIIA or IVA of the Periodic Table, or of a metalloid having a valency of at least 3 from a B Group of the Periodic Table.

(The Periodic Table referred to is as in "Abridgements of Patent Specifications" published by the British Patent Office").

The first polyester component is preferably capable of a relatively high level of crystallinity, for example over 30%, especially 50–90%, in the absence of plasticiser.

Suitable PHAs will be or include at least one having units of formula I:

$$-O-C_mH_n-CO-\qquad\qquad I$$

where m is in the range 1–13 and n is 2 m or (if m is at least 2) 2 m–2. Typically $C_m H_n$ contains 2–5 carbon atoms in the polymer chain and the remainder (if any) in a side chain. In very suitable polyesters n is 2 m and especially there are units with m=3 and m=4 copolymerised and with respectively a $C_1$ and $C_2$ side chain on the carbon next to oxygen in the chain. Particular polyesters contain a preponderance of m=3 units, especially with 70–95 mol % of such units, the balance being units in which m=4. The molecular weight $M_w$ of the PHA is for example over 50000, especially over 100000, up to eg $2\times10^6$.

In PHAs having units with m=3 and m=4 there may be very small, typically fractional, percentages of units having higher values of m. PHA consisting essentially of m=3 units is poly-3-(R)-hydroxybutyrate (PHB), and PHA consisting of m=3 and 4 units is polyhydroxybutyrate-co-valerate (PHBV).

The PHA can be a product of fermentation, especially of a microbiological process in which a microorganism lays down PHA during normal growth or is caused to do so by cultivation in starvation of one or more nutrients necessary for cell multiplication. The microorganism may be wild or mutated or may have the necessary genetic material introduced into it. Alternatively the necessary genetic material may be harboured by an eukariote, to effect the microbiological process.

Examples of suitable microbiological processes are the following: for Formula I material with m=3 or m=partly 3, partly 4:

EP-A-69497 (Alcaligenes eutrophus) for Formula I materials with m=3:
U.S. Pat. No. 4101533 (A. eutrophus H-16)
EP-A-144017 (A. latus);
for Formula I material with m=7–13:
EP-A-0392687 (various Pseudomonas).

The PHA can be extracted from the fermentation product cells by means of an organic solvent, or the cellular protein material may be decomposed leaving microscopic granules of PHA. For specialised end uses the cellular protein may be partly or wholly allowed to remain with the PHA, but preferably subjected to cell breakage.

Second component PHA may be synthesised by chemical processes known in the art. PHB can be prepared according to Bloembergen, S. and Holden, D. A., Macromolecules. 1989, Vol 22, p1656–1663. PHBV can be prepared according to Bloembergen, Holden, Bluhm, Hamer and Marchessault, Macromolecules. 1989, Vol 22, p1663–1669.

The second polymer component may be for example one or more of (a) a different production batch of same PHA;

(b) a PHA of different chemical composition;

(c) a PHA as in (a) or (b) but with a different history, for example a different manufacturer or a different source, for example re-work or recycled or naturally occurring material;

(d) a synthetic polyester, for example a head-to-tail polyester or a substantially stoichiometric head-to-head tail-to-tail polyester.

(e) a synthetic polyester having only alcohol or phenol reactivity or only acyl reactivity;

(f) other synthetic polyesters, having potential acylatable and or esterifiable groups.

If the second polyester component is type (b) it may have a crystalline melting point higher by at least 10° C., preferably at least 30° C., especially at least 50° C. than that of the first polyester component. Very suitably the second polyester component consists of units according to Formula I of which at least 99 mol % have m=3 and the methyl side chain, that is, are substantially poly-3-R-hydroxybutyrate homopolymer. The first polyester component is then preferably the PHA containing 70–95, especially 82–95 mol % m=3 units, balance m=4 units. The first component polyester may itself be a blend of PHAs containing mot percentages of m=3 units in the range 50–98%, balance in each case m=4 units.

If the second polyester component is of type (d) it may be for example a poly-2-hydroxyalkanoate such as a polyglycolic acid or polylactic acid, or it may be a synthetic polypropiolactone, polybutyrolactone, polyvalerolactone, polycaprolactone or a caprolactone copolymer.

Examples of suitable synthetic polyesters are especially polycaprolactone, polylactides, and polyesters containing combinations of dicarboxylic acids or derivatives thereof and diols. Such dicarboxylic acids may be selected from the group consisting of malonic, succinic, glutaric, adipic, pimelic, azelaic, sebacic, fumaric, 2,2-dimethylglutaric, suberic, 1,3-cyclopentane dicarboxylic, 1,4-dicyclohexane-dicarboxylic, 1,3-cyclohexane dicarboxylic, diglycolic, itaconic, maleic, 2,5-norbornane dicarboxylic and ester forming derivatives thereof and combinations thereof. Such diols may be selected from the group consisting of ethylene glycol, diethylene glycol, propylene glycol, 1,3-propanediol, 2,2-dimethyl-1,3-propanediol, 1,3 butanediol, 1,4-butanediol, 1,5-pentanediol, 1,6-hexanediol, 2,2,-trimethyl-1,6-hexanediol, thiodiethanol, 1,3- cyclohexanedimethanol, 1,4-cyclohexanedimethanol, 2,2,4,4-tetramethyl-1,3-cyclobutanediol, triethyleneglycol, tetraethyleneglycol, di-, tri-, tetra-propyleneglycol and combinations thereof. Also suitable are cellulose acetates or buryrates, and the copolymer of succinic acid and butylene glycol, The first polyester and second polymer components can be present in the composition in any suitable amount to provide the desired composition. Typically each component will be present in amounts from 5–90 preferably 20–80% w/w.

The inorganic oxy compound may be for example a compound of an alkaline earth metal, (for example calcium, aluminium, titanium, zirconium, tin or antimony. Titanium preferably has a valency of 4.

Preferably the inorganic oxy compound is an alkoxide, phenoxide, enolate or carboxylate particularly for example, titanium butoxide (n-, iso, or tert-) or titanium propoxide (n- or iso); the organic part of the compound is preferably chosen preferably to afford substantial involatility during melt processing of the PHA. If desired, the organic part may be partly polyvalent, for example derived from a potyhydric alcohol such as a glycol or glycerol or polyvinyl alcohol or a hydroxycarboxylic acid. Chelate compounds may be used. When carbon atoms are present typically the number of carbon atoms per inorganic atom is in the range 4 to 24. If desired, the compound can be introduced as oxide. A preferred oxide compound is antimony trioxide.

The content of the oxy compound in the composition is preferably in the range 0.1 to 5 phr, at which levels it is effective as a transesterification catalyst.

In a preferred form of either aspect of the invention the composition comprises one or more reaction products of one or more of the first polyester component, second polyester component, other polyester component (if present) and the oxy compound, Such reaction product may be a decomposition product of the compound, and such reaction product may promote nucleation and thus crystallisation of the polyester.

Alternatively, the resulting reacted blend may give a more readily crystallisable polymer compared to that of an unreacted blend.

A further or additional alternative is that such a product may be the result of transesterification catalysed by the oxy compound or a decomposition product thereof. The transesterification product may be the result of redistributing the chain lengths and/or repeating unit combinations in a nominally single polyester. It may be the result of such redistribution of a mixture of nominally different polyesters or other polymers as listed above. It may be the result of transesterification when the oxy compound is an alkoxide, such that inorganic atoms become incorporated into the polyester chains. Two or more of such transesterifi-cations may take place. This can lead to an increase in $M_w$ in a single component or multi-component composition which gives an apparent improvement in thermal stability.

One aspect of the invention is that the average weight average molecular weight ($M_w$) of the transesterified polymer composition may be greater than one of the composition, containing no inorganic oxy compounds. It may be in certain circumstances that the mechanical properties of the composition of the present invention may be raised to a level sufficient for practically use, whereas without the catalyst the composition was not usable.

The composition is preferably one having a higher speed of crystallisation than the untreated polyester.

In a second preferred composition the polyester components are not compatible and do not give a single Tg but the transesterified blend shows a Tg distinct from and additional to or replacing that of the starting components. The transesterified product thus acts as compatibiliser for the starting components.

The invention provides a method of making the composition by mixing the components. The oxy compound may be mixed with PHA granules and melted with them; or mixed into a PHA melt; or mixed with PHA and an organic liquid if solvent processing is used.

Preferably the composition is heat treated in the melt to permit one or more of the reactions mentioned above. As an alternative, the composition may be shaped before such reactions or while they are incomplete, and a heat treatment applied to shaped articles. A particular example is the procedure of blending in an extruder followed by granulating and melt-shaping the extrudate.

The composition may contain any of the usual polymer processing additives, for example particulate fillers, reinforcing fibres, pigments, nucleating agents and plasticisers.

In particular one or more plasticisers may be present. The ratio of plasticiser to polymer depends on the intended use of the composition. The range 2–40 phr w/w includes most of the likely uses. For making effectively rigid but not brittle articles the range 5–20 especially 6–12, phr w/w is generally suitable.

Any of the known plasticisers for these polymers are suitable and any plasticisers which are found to plastise these polymers subsequent to this invention would be suitable for use herein. Examples of suitable plasticisers are:

(a) high boiling esters of polybasic acids, such as phthalates, isophthalates, citrates, fumarates, glutarate, phosphates or phosphites. The esterified radicals may be for example $C_1$–$C_{12}$ atkyl, aryl or aralkyl. Particular examples are dioctyl-, diheptyl- and diundecyl- phthalates and dialkylalkylene oxide glutarate (Plasthall 7050);

(b) high boiling esters and part- of polyhydric alcohols, especially glycols, polyglycols and glycerol. The acid derived radicals of the ester typically contains 2–10 carbon atoms. Examples are triacetin, diacetin and glyceryl dibenzoate;

(c) aromatic sulphonamides such as paratoluene sulphonamide.

A particularly preferred plasticiser is a doubly esterified hydroxycarboxylic acid having at least 3 ester groups in its molecule. "Doubly esterified" means that at least some of the hydroxy groups of the hydroxycarboxylic acid are esterified with a carboxylic acid and at least some of the carboxy groups thereof are esterified with an alcohol or phenol. Preferably at least the hydroxycarboxylic acid from which the ester is derived is aliphatic or cycloaliphatic. Its backbone structure (that is, apart from carboxy groups) preferably contains 2–6 carbon atoms. It contains preferably 2–4 carboxy groups and 1–3 hydroxy groups; and preferably the number of carboxy groups exceeds the number of hydroxy groups. An example of such a plasticiser is Estafiex* (acetyltri-n-butyl citrate. (* Trade mark of AKZO)

The polymer composition may contain any other of the additives commonly used in polymer processing, for example, pigment, particulate or fibrous or platy filler or reinforcer, and nucleating agents, especially boron nitride, talc, ammonium chloride or DZB/Zn Stearate.

The nucleant is preferably present in amounts in the range from 0.2 to 2 phr.

In a yet further aspect the invention provides a process of making shaped articles by confining, eg in a mould or on a surface or through a die, a composition as defined above, then preferably subjecting it to a temperature at which crystallisation is rapid. The process is operable at significantly shorter cycle times than when using previously available PHA compositions.

The polymer can be used in any of the usual methods for forming articles such as injection moulding, compression moulding, extrusion of fibre or films, extrusion of profile, gas-current spinning, tack spinning, coating melt onto substrate, coating latex onto substrate, shaping solution in volatile solvent.

Examples of shaped articles made by such methods include films especially for packaging, coated products (such as paper, paperboard, non-woven fabrics), fibres, non-woven fabrics, extruded nets, personal hygiene products, bottles and drinking vessels, agricultural and horticultural films and vessels, slow-release devices, ostomy bags. Alternatively, the polymer composition with suitable additives can be used as an adhesive.

Thus, the present invention provides method of increasing compatibility of different polyesters in polymer blends and hence a method of improving the physical properties of such blends. The inorganic oxygen containing compounds which bring about these improvements, which may be acting as transesterification catalysts, can also be used to maintain or increase the molecular weight of a blend of the same or different polymers or to increase the resulting melt viscosity of blends of polymers whose individual components have widely differing melt viscosities. These advantageous properties are described in the following examples which are illustrative of the present invention and do not limit the scope of the invention.

EXPERIMENTAL METHODS

Melt Processing

The polymeric components plus oxy compound were powder blended and melt processed in a Betol single screw extruder. For blends of HB homopolymer with HB/HV copolymers (Examples 1 and 2) the barrel zone temperatures were set at 140°, 160° and 180° C. respectively. The materials were extruded through a 5 mm diameter circular die and granulated to polymer chip. The chips were injection moulded into tensile or impact test bars. The tensile bars were of gauge length 40 mm with typical cross-sectional areas of 2.4×5.3 mm. The impact bar dimensions were 4.45×13.0×118 mm.

Mechanical Tests

Tensile testing was on an Instron 1122 fitted with a Nene data analysis programme. A cross-head speed of 10 mm min$^{-1}$ was used. Izod impact strength was determined using a Zwick pendulum apparatus. The impact bars were notched at 1 mm radius.

Thermal Analysis

Differential Scanning Calorimetry (DSC) was used. A Perkin Elmer DSC-7 was operated under programmed heating control from 20° to 200° C. at 20° C. min.$^{-1}$ to measure melting behaviour. Crystallisation behaviour was monitored by cooling from 200° to 20° C. min$^{-1}$. From these measurements the melting peak temperature ($T_{m\,peak}$) and the crystallisation peak temperature ($T_{cryst}$) and enthalpies of fusion and crystallisation $\Delta H_{fus}$ and $\Delta H_{cryst}$ were determined. Glass transition temperatures Tg were measured by heating from 20° to 200° C. at 100° C. min$^{-1}$. The molten material was rapidly quenched to −45° C. by cooling at 100° C. min$^{-1}$. The amorphous sample was then reheated to 100° C. at 20° C. min$^{-1}$. The glass transition was the point of inflexion in the heating trace.

This invention is illustrated by the following Examples, in which these abbreviations will be used:

HB homopolymer=poly-3-R-hydroxybutyric acid of $M_w 558000$, made by fermentation using A.eutrophus. (Formula I, m=3; $CH_3$ side chains)

HB HV copolymer=copolymer of poly-3-R-hydroxybutyric acid (HB) and 3-R-hydroxyvaleric acid, made by fermentation using A.eutrophus with substrate containing propionic acid, (Formula I, m=partly 3, partly 4; ($CH_3$ and $C_2H_5$ side chains).

73B/27V copolymer consisting of 73 mol % 3-R-hydroxybutyrate units and 27 mol % 3-R-hydroxyvalerate units.

80B/20V analogous.

PLA polylactic acid of $M_w$=686000.

phr weight of additive "per hundred parts by weight of resin" (ie polymer)

EXAMPLE 1

73B/27V copolymer blended with HB homopolymer.

Each blend contained equal weights of the polymers and 1 phr of additive:

A tetra-n-propyl titanate (i.e. titanium (IV) tetra-n-propoxide);

B tetra-n-butyl titanate (i.e. titanium (IV) tetra-n-butoxide); or

C $Sb_2O_3$ (antimony oxide)

DSC results are shown in Table 1. Additives B and C decreased peak melting temperature by 9° C. On cooling, whereas the copolymer with no additive crystallised very slowly, such that an exotherm was not observed, the composition involving A yielded a pronounced exotherm. Similar but smaller exotherms were observed for the B and C systems. This could be atributed to nucleation and/or chemical modification: see Example 2. Table 1 shows also that the additives yielded mechanical properties similar to the control with the added benefit of faster crystallisation.

TABLE 1

| Additive | $T_m$ peak °C. | $\Delta H$ fus $Jg^{-1}$ | T Cryst °C. | $\Delta H$ cryst $Jg^{-1}$ | $M_w$ '000 | Tens Str MPa | Young's Modulus MPa | Elong at break % | Izod Impact $Str/Jm^{-1}$ |
|---|---|---|---|---|---|---|---|---|---|
| None | 176.2 | 51.8 | n.o. | 0 | 467 | 21 | 506 | 15.3 | 95 |
| A | 175.8 | 34.7 | 71.6 | −32.0 | 489 | 21 | 460 | 15 | 90 |
| B | 167.2 | 43.1 | 60.9 | −19.0 | 493 | 20 | 477 | 15 | 82 |
| C | 167.5 | 45.4 | 67.1 | −8.8 | 437 | 21 | 510 | 15 | 87 |

EXAMPLE 2

Separate tests of 73B/27V Copolymer and PHB Homopolymer

Samples of each material were mixed with 1 phr of additive A, B, or C, extruded and granulated as described above. The granules were tested in DSC for melting behaviour; the melt was held at 200° C. for 10 min to permit any likely chemical reaction; the melt was then cooled by Dsc to observe cyrstallisation behaviour. The results are shown in Table 2.

TABLE 2

| % HV | Additive | Melting | | Crystallisation | |
|------|----------|---------|---|----------------|---|
|      |          | T Peak °C. | ΔH fus $Jg^{-1}$ | T cryst °C. | ΔH cryst $Jg^{-1}$ |
| 0  | None | 172.0 | 92.5 | 60.7 | −48.0 |
| 0  | A    | 172.4 | 72.7 | 64.1 | −53.9 |
| 0  | B    | 173.3 | 83.6 | 63.4 | −48.1 |
| 27 | None | 114.8 | 70.4 | n.o. | 0 |
| 27 | C    | 113.6 | 69.2 | n.o. | 0 |
| 27 | A    | 114.2 | 79.7 | n.o. | 0 |
| 27 | B    | 114.0 | 79.9 | n.o. | 0 |

Key
n.o. = not observed

It is evident that the additives have little effect on the melting or crystallisation of either polymer taken separately. However, taking these results with those of Example 1 it is evident that the presence of homopolymer and additive is necessary to promote crystallisation of the copolymer.

EXAMPLE 3

80B/20V Copolymer blended with PHB Homopolymer

The procedure, additives and proportions defined in Example 1 were used. DSC results and the mechanical properties are summarised in Table 3, The melting point trends were the same as in Example 1. The 20% HV copolymer crystallised more rapidly and a crystallisation exotherm of −10.83 $Jg^{-1}$ was observed for the control. The reaction mixtures containing A and B yielded much higher crystallisation energies suggesting that these reaction conditions had produced a faster crystallising composition. Similar trends to those given in Example 1 were observed in mechanical properties.

EXAMPLE 4

73B/27V Copolymer with Poly-L-lactic Acid (PLA)

Each blended composition contained equal weights of the polymers and 1 phr of additive B or C.

(a) The materials were melt processed in a Betol extruder with barrel zone temperatures set at 158, 189 and 208 respectively. The polymer was extruded through a 5 mm diameter circular die heated to 208° C. The extrudate was cut to form moulding feed granules.

(b) The granules were, to promote further reaction, melted and then heated at 200° C. for 10 min. The material was then rapidly cooled and its Tg(s) measured as described.

Results are shown in Table 4.

TABLE 4

| | Extrudate | | | After Further Heating | | |
|---|---|---|---|---|---|---|
| Additive | Tg (1) PHB/ PHV | Tg (2) | Tg (3) PLA | Tg (1) PHB/ PHV | Tg (2) | Tg (3) PLA |
| None | −5.3 | — | 59.9 | −7.01 | — | 55.5 |
| B    | −5.0 | — | 60.1 | −6.4  | — | 57.13 |
| C    | −5.9 | — | 58.5 | −7.8  | 24 | 54.1 |

The PHBV and PLA are mutually incompatible in the melt and amorphous phases as is evident from the multiple Tg corresponding to those of the PHBV and PLA components respectively. For materials compatible in the amorphous and melt phases a composition-dependent Tg may be calculated using the Fox equation (T G Fox-Bull. Am. Phys. Soc. 123, 2, 1956)

$$\frac{1}{Tg \text{ (blend)}} = \frac{W(PHBV)}{Tg(PHBV)} + \frac{W(PLA)}{Tg(PLA)}$$

For a 50:50 PHBV/PLA blend, the predicted Tg for a compatible phase is approximately 24° C. (assuming Tg=−5° C. and 60° C. for the individual PHBV and PLA components respectively).

This estimate corresponds very well to the intermediate Tg observed for the antimony oxide system. This suggests that heating promoted a chemical change within a proportion of the composition and produced a compatible polymer system.

EXAMPLE 5

PHBV containing 21% HV and PHB homopolymer

Each blended composition contained equal weights of the polymers and 1 phr of boron nitride. The materials were melt processed in a Betol extruder with barrel zone temperatures set at 150°, 160° and 170° C. respectively using methods as previously described. Tensile test bars were prepared as hereinbefore described. The samples were tested after a 1 month post-moulding.

TABLE 3

| Additive | T peak | ΔH fus | T cryst | ΔH cryst | $M_w$ '000 | Tens str MPa | Young's Modulus MPa | Elong at break % | Izod Impact $Str/Jm^{-1}$ |
|----------|--------|--------|---------|----------|-----------|--------------|---------------------|------------------|---------------------------|
| None | 175 | 69.5  | 62.41 | −10.83 | 458 | 27 | 730 | 12.0 | 79 |
| A    | 173 | 70.06 | 60.8  | −21.60 | 473 | 26 | 670 | 12.0 | 74 |
| B    | 167 | 49.19 | 66.23 | −28.37 | 462 | 26 | 665 | 12.0 | 73 |
| C    | 167 | 53.1  | 65.11 | −11.5  | 447 | 26 | 771 | 10.0 | 54 |

TABLE 5

| | 1 MONTH TEST DATA | | | | | |
|---|---|---|---|---|---|---|
| Blend | I | II | III | IV | V | VI |
| A | 295000 | 88300  | 3.35 | 78.25  | 715.7 | 13.12 |
| B | 385000 | 110000 | 3.50 | 103.75 | 648.7 | 17.80 |

TABLE 5-continued

1 MONTH TEST DATA

| Blend | I | II | III | IV | V | VI |
|---|---|---|---|---|---|---|
| C | 362000 | 100000 | 3.59 | 121.25 | 609.3 | 18.56 |

Key
I   $M_w$ (weight average molecular weight)
II  Mn (number average molecular weight)
III $M_w$/Mn
IV  1 mm notched IZOD Impact Test (Jm$^{-1}$)
V   Young's Modulus (MPa)
VI  Elongation to break (%)

EXAMPLE 6

The experiment detailed in Example 5 was repeated with a blend of PHBV copolymer (6%HV) and polycaprolactone (PCL) (Tone 787 Union Carbide Limited) and a range of catalysts. Each blend contained 80% PHBV and 20% PCL, 1 phr boron nitride and 1 phr of catalyst. The control samples contained all the ingredients except the catalyst. Tensile bars were made from the blend. The combinations of polymer blend and catalyst are given in Table 6 with the results of elongation to break tests given as the percentage increase in elongation to break compared to the control sample. The samples were 6 weeks old when the test was carried out.

TABLE 6

| Blend | Catalyst | E to B % |
|---|---|---|
| 1 | calcium carbonate | 40 |
| 2 | aluminium oxide acidic | 40 |
| 3 | aluminium oxide basic | 36 |
| 4 | aluminium oxide active | 25 |
| 5 | aluminium isopropoxide | 20 |
| 6 | titanium IV propoxide | 83 |
| 7 | titanium IV butoxide | 40 |
| 8 | titanium IV butoxide and ethylene glycol (24%) | 100 |
| 9 | titanium IV butoxide and methyl propanoate (50%) | 36 |
| 10 | none | 0 |

EXAMPLE 7

The results described in the previous examples provide evidence that titanium propoxide and titanium butoxide may be transesterifying the polymer blend. An experiment was set up to assess the effects of such catalysts on the melt viscosity of the molten blend.

Extruded granule samples containing 5 g of the polymer blends shown in Table 7 were rapidly charged into a standard melt flow grader (manufactured by Davenport UK). This was fitted with a standard die of length 8 mm and diameter 2.095 mm and preheated to 180°±0.5° C. After 4.5 minutes heating up time, a 2.2 kg weight was applied to the piston. The resulting extrudate was cut off after the 5 minute time interval and discarded. Cut-offs were then subsequently taken at 1 minute intervals and weighed. In polyolefins, the melt flow index (MFI) is defined as the weight of polymer extruded under standard conditions over a 10 minute period.

In this experiment, the "instantaneous" melt flow index is defined as 10 times the weight of polymer extruding from the dye in a 1 minute time period. This is because, under the conditions used, poly(hydroxybutyrate-co-hydroxyvalerate) polymers degrade and the MFI increases with time. The doubling time Td is defined as the time interval over which the MFI value is seen to increase by a factor of two.

When the logarithms of the "instantaneous" MFI's were plotted, a straight line relationship was observed. This allowed the MFI at 5 minutes heating time and the Td to be calculated. The results observed are tabulated below.

TABLE 7

| | Formulation | | | | |
|---|---|---|---|---|---|
| Catalyst | Catalyst (phr) | Homo-polymer | 21% HV copolymer | MFI at 5 mins/g | Td/mins |
| None | 0 | 50 | 50 | 11.80 | 1.4 |
| Titanium IV propoxide | 1 | 50 | 50 | 5.45 | 2.47 |
| Titanium IV butoxide | 1 | 50 | 50 | 4.03 | 2.82 |

The results indicate that the 5 minutes MFI is reduced by a factor or two for the formulations containing titanium catalysts. The time taken for the MFI to double also increased significantly.

As high MFI's are associated with low melt viscosities, the use of the catalyst system leads to an increase in melt viscosity. This may be explained in two ways. The homopolymer component of the blend has a peak melting point of 175° C. and the 21% copolymer has a peak melting point of 144° C. Under the conditions used for the test, the copolymer is in excess of 35° C. above its melting point and would be expected to have a very low melt viscosity compared to the homopolymer. Consequently this would tend to plasticise the blend and lead to high MFI's as observed for the system with no catalyst.

The use of catalyst potentially transesterifies the two polymeric components leading to blocks of homopolymer along the copolymer chain and vice-versa. This would be expected to lead to a higher melt viscosity and consequently lower MFI's. This is what is observed in the results of this example.

In addition to this in the formulations containing catalyst the rate of increase of MFI with time at temperature becomes less pronounced. This could be interpreted in terms of a thermal stability effect with the transesterification process leading to a preservation of molecular weight and competing with the normal scission processes observed during the thermal degradation of poly(hydroxybutyrate-co-hydroxyvalerate).

To test this theory, thermal degradation studies were conducted using a differential scanning calorimeter (Perkin Elmer DSC4) as the heat source. The degradations were done under nitrogen. Samples of 10 mg size were taken for the formulations listed in Table 8 and encapsulated in aluminium pans. The samples were rapidly heated to 180° C. at 100° C. min$^{-1}$ and maintained at temperature for a range of set times ranging from 1 to 10 minutes. The material was then rapidly cooled at -200° C. min$^{-1}$ to room temperature and the molecular weight of the resulting polymer measured.

Tanfield (ref: Physical Chemistry of Macromolecules, (1961) pages 612–619. Pub. John Wiley.) describes methods for measuring the rate constant for random scission degradation.

In the early stages of degradation $$\frac{1}{x_w} = \frac{1}{(x_w)_o} - \frac{kt}{2}$$

$X_x$=the weight average degree of polymerisation of the degraded polymer at time t $(x_w)_o$ = the weight average degree of polymerisation of the polymer at t=0 and k = the rate constant describing the rate of bond scission.

A plot of the $1/x_w$ against t yields a linear plot and allows k to be calculated as 2×the gradient.

TABLE 8

| Catalyst | Catalyst Level phr | Homo-polymer % w/w | 21% HV % w/w | k/s$^{-1}$ |
|---|---|---|---|---|
| None | 0 | 50 | 50 | 1.56 × 10$^{-6}$ |
| Titanium IV Butoxide | 1 | 50 | 50 | 1.05 × 10$^{-6}$ |

The results suggest that the rate of bond scission is lower for the system containing catalyst and that consequently it may be acting as a route to thermal stabilisation.

I claim:

1. A polymer composition comprising a first component which is a polyhydroxyalkanoate (PHA), a second component which is a different PHA or a synthetic polyester which is a polypropiolactone, polybutyrolactone, polyvalerolactone, polycaprolactone or copolymer thereof, a polyactide, a polyester containing a combination of a dicarboxylic acid component and diol, the dicarboxylic acid component being selected from the group consisting of malonic, succinic, glutaric, adipic, pimelic, azelaic, sebacic, fumaric, 2,2-dimethylglutaric, suberic, 1,3-cyclopentane dicarboxylic, 1,4-dicyclohexane-dicarboxylic, 1,3-cyclohexane dicarboxylic, diglycolic, itaconic, maleic, 2,5-norbornane dicarboxylic, ester forming derivatives thereof and combinations thereof and the diol being selected from the group consisting of ethylene glycol, diethylene glycol, propylene glycol, 1,3-propanediol, 2,2-dimethyl-1,3-propanediol, 1,3 butanediol, 1,4-butanediol, 1,5-pentanediol, 1,6-hexanediol, 2,2,-trimethyl-1,6-hexanediol, thiodiethanol, 1,3-cyclobutanediol, triethyleneglycol, tetraethyleneglycol, di-, tri-, tetra-propyleneglycol, combinations thereof, a cellulose, cellulose acetate, cellulose butyrate, and the copolymer of succinic acid and butylene glycol, in which 5% to 90% of each of said first and second components are present by weight and 0.1 to 5 phr of at least one transesterification catalyst which is an oxy compound of a metal from Group 11A or 111A or IVA of the Periodic Table, or of a metalloid having a valency of at least 3 from a B Group of the Periodic Table.

2. A polymer composition according to claim 1 in which the second component is selected from group consisting of polyhydroxyalkanoate, polycaprolactone and potylactide.

3. A polymer composition according to claim 1 in which the first component is capable of over 30% crystallinity in absence of plasticiser.

4. A polymer composition according to claim 1 in which (a) the first and second polymer components are different PHA having repeating units of formula:

—O—CmHn—CO— where n=2 m;

(b) the first component contains 70-95 mol percent of m=3 units with m being 4 in the balance of the units therein;

(c) the second component contains at least 99 mol percent of units where m=3 with m being 4 in the balance of the units therein; and (d) the components have been reacted sufficiently to increase the crystallization velocity, and/or to decrease the rate of thermal degradation.

5. A polymer composition according to claim 1 in which the second component is a polylactic acid, the oxycompound is antimony trioxide and the components have been reacted sufficiently to produce a phase having a glass transition at a temperature different from that of either starting component.

6. A polymer composition according to claim 1 in which the second component is polycaprolactone and the components have been reacted sufficiently to increase the elongation-to-break as compared with the value for the corresponding composition not containing the oxy compound.

7. A composition according to claim 1 in which the oxy compound is introduced as a titanium alkoxide.

8. A process for preparing a composition according to claim 1 by mixing the components and the oxy compound and heat treating the mixture in a molten state to react said components.

9. A process of making shaped articles which comprises shaping a composition according to claim 1 and subjecting it to a crystallization temperature.

* * * * *